United States Patent [19]
Dohnke et al.

[11] Patent Number: 5,800,215
[45] Date of Patent: Sep. 1, 1998

[54] DISTRIBUTION DEVICE FOR THE TELECOMMUNICATION AND DATA TECHNIQUE

[75] Inventors: Ingo Dohnke, Teltow; Gunter Hegner; Gerd Richter, both of Berlin, all of Germany

[73] Assignee: Krone Aktiengesellschaft, Berlin-Zehlendorf, Germany

[21] Appl. No.: 719,784

[22] Filed: Sep. 25, 1996

[30] Foreign Application Priority Data

Sep. 29, 1995 [DE] Germany .................. 195 37 529.7
Sep. 29, 1995 [DE] Germany .................. 295 15 984.7
Sep. 29, 1995 [DE] Germany .................. 295 15 983.9

[51] Int. Cl.⁶ .......................................... H01R 29/00
[52] U.S. Cl. .................................... 439/719; 439/922
[58] Field of Search ...................... 439/49, 719, 709, 439/922, 188; 200/51.09, 51.1; 361/826, 827

[56] References Cited

FOREIGN PATENT DOCUMENTS

| 0 402 658 A2 | 12/1990 | European Pat. Off. . |
| 32 01 894 C1 | 6/1983 | Germany . |
| 41 14 947 C1 | 8/1992 | Germany . |
| 93 02 456.8 | 5/1993 | Germany . |
| 43 06 349 C1 | 3/1994 | Germany . |
| 44 23 339 C1 | 9/1995 | Germany . |

OTHER PUBLICATIONS

*HVt 71–Geräte Übersicht Krone AG Catalogue* .

Primary Examiner—Neil Abrams
Assistant Examiner—T. C. Patel

Attorney, Agent, or Firm—McGlew and Tuttle

[57] ABSTRACT

A distribution block for telecommunication and data transmission applications, in particular for the main distribution frame of telephone and data lines. The distribution block includes insulation displacement contact elements for the connection of the subscriber cables as well as of the exchange office cables. One-piece contact springs are disposed in the interior of the modular-design distribution block. A mounting bracket, in particular for receiving distribution blocks is provided including a U-shaped tub. A device for guiding cables is rotatably moved in a partial section, and with cable guide portions. A reduction in size, an improvement of connection tasks, the individual protection of double wires, a reliable grounding and a cable guiding which is substantially resistant to buckling and bending are secured, is achieved by that one-piece contact springs disposed in the interior of distribution block. These springs are formed by insulation displacement connection contacts at the front and rear sides of the block by a telephone contact in a central section, the phone contact being composed of at least two contact surfaces which may be double contacts, and by a support surface. A tongue acts on the support surface with a cam. A tapping contact is provided in the front section of contact spring. A mounting bracket is provided with a tub bottom and contact lugs for the establishment of an electrically conducting and of a mechanical connection and openings for the insertion of protection plugs or the like. A device for guiding cables is provided including a rack frame or the like rigidly disposed cable guide portions that are positioned upwardly and downwardly offset to cable guide portions.

20 Claims, 10 Drawing Sheets

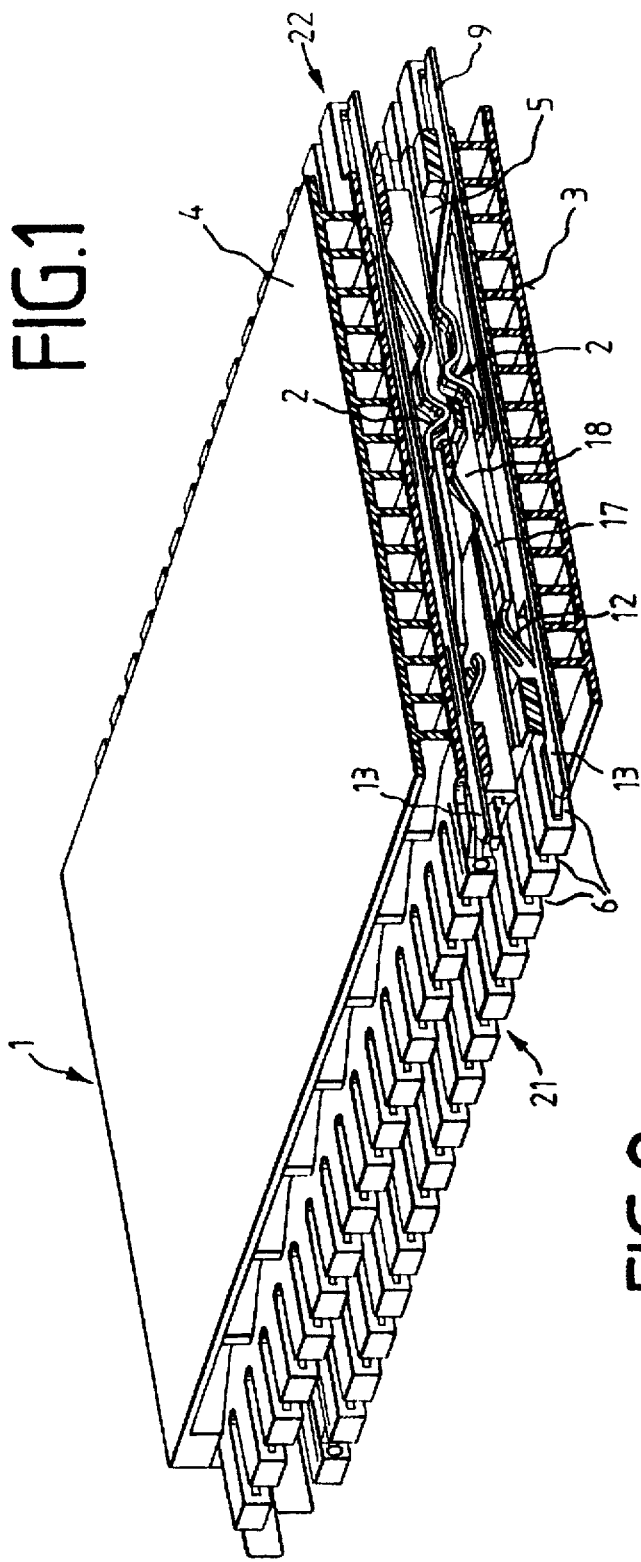
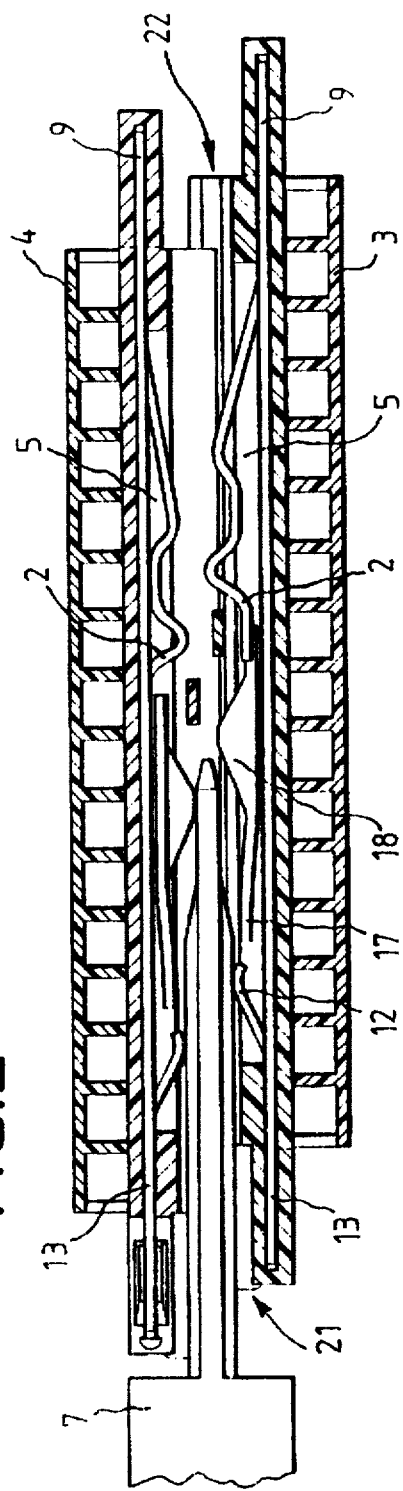
FIG.1
FIG.2

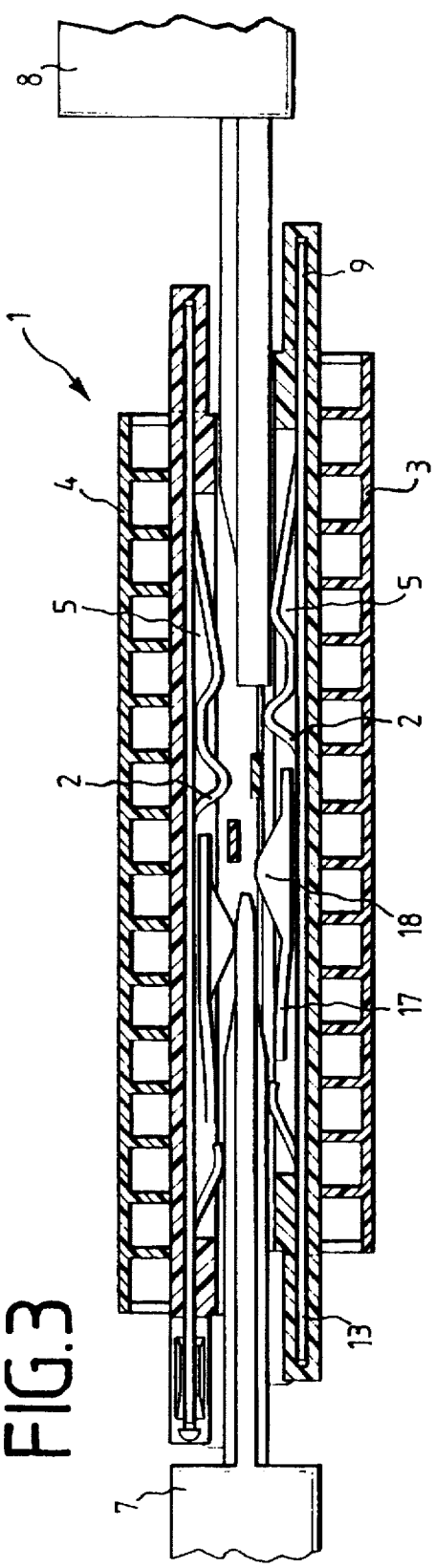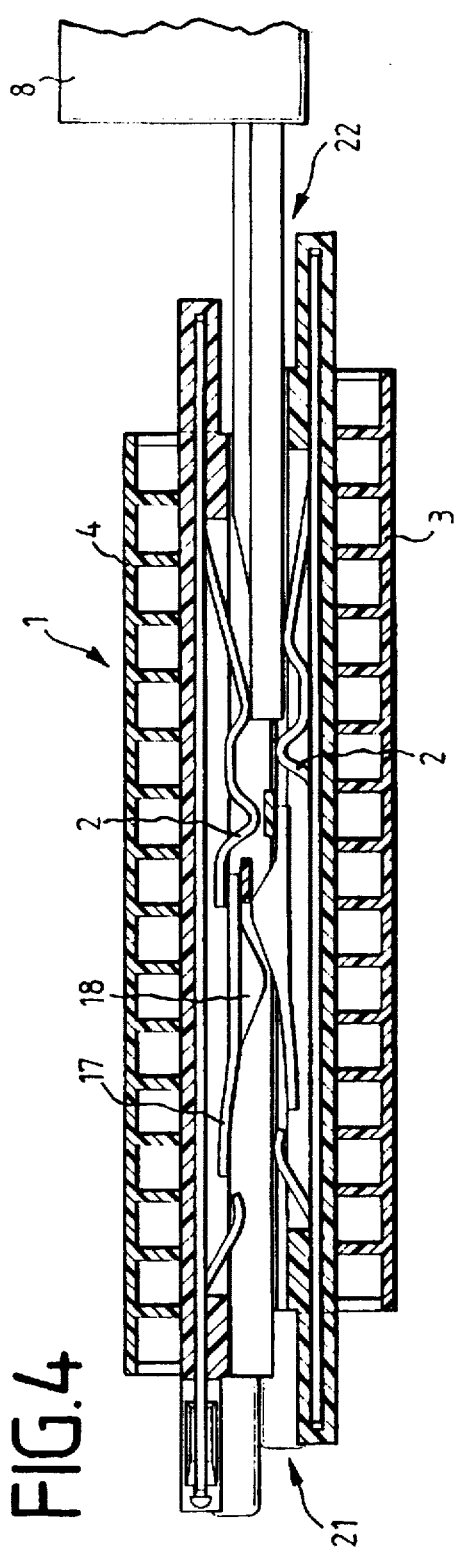

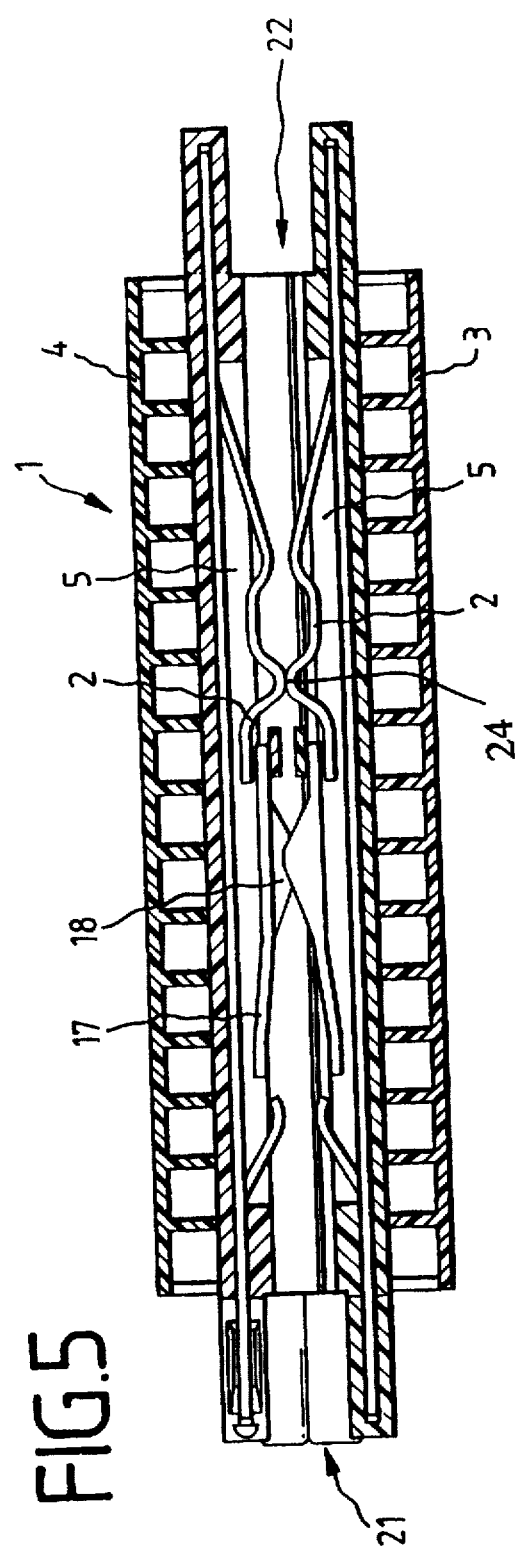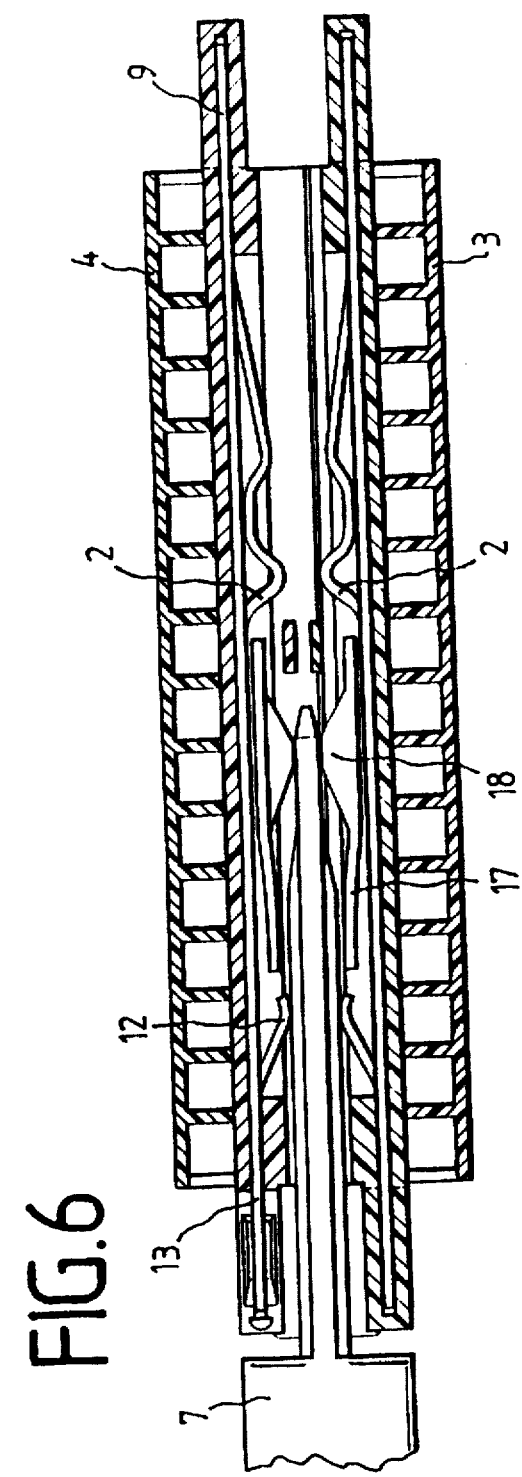

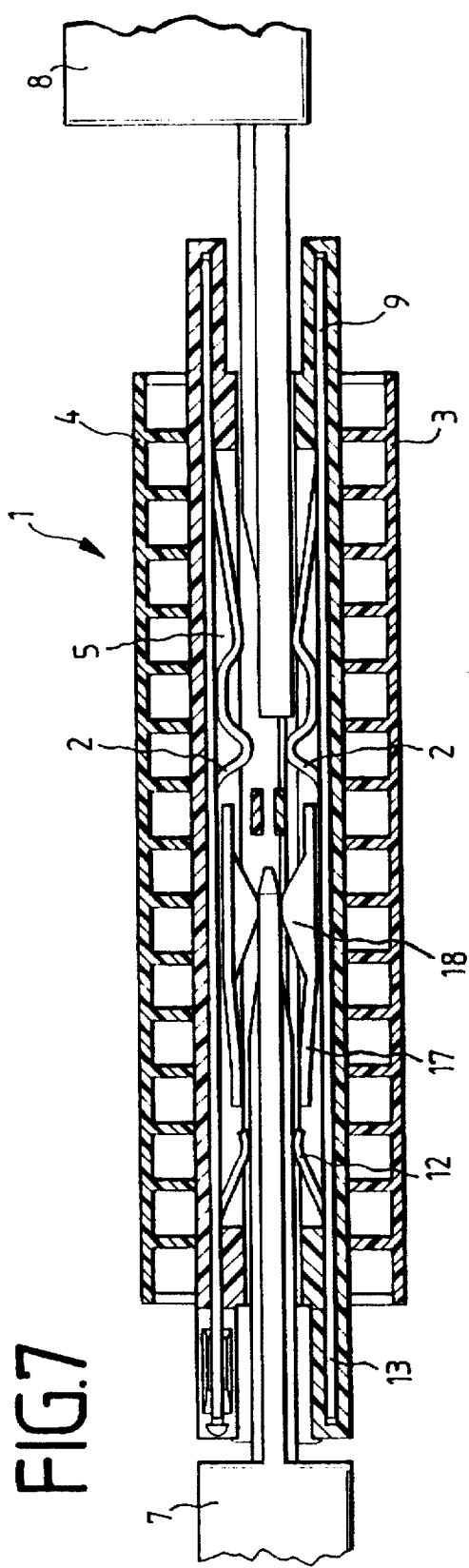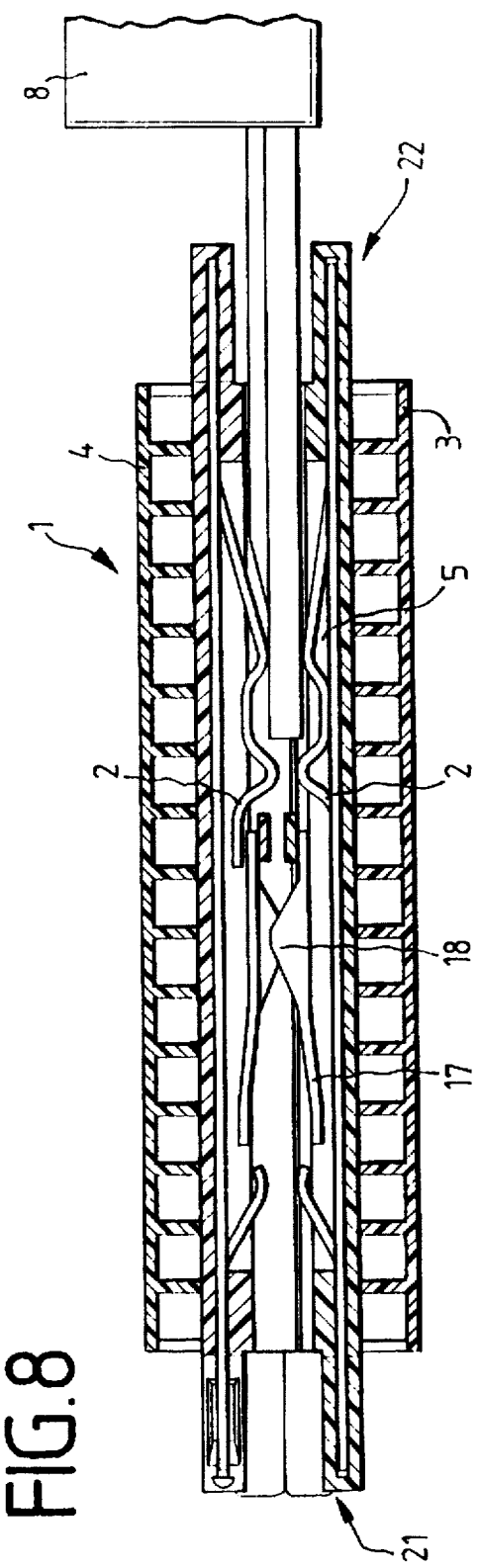

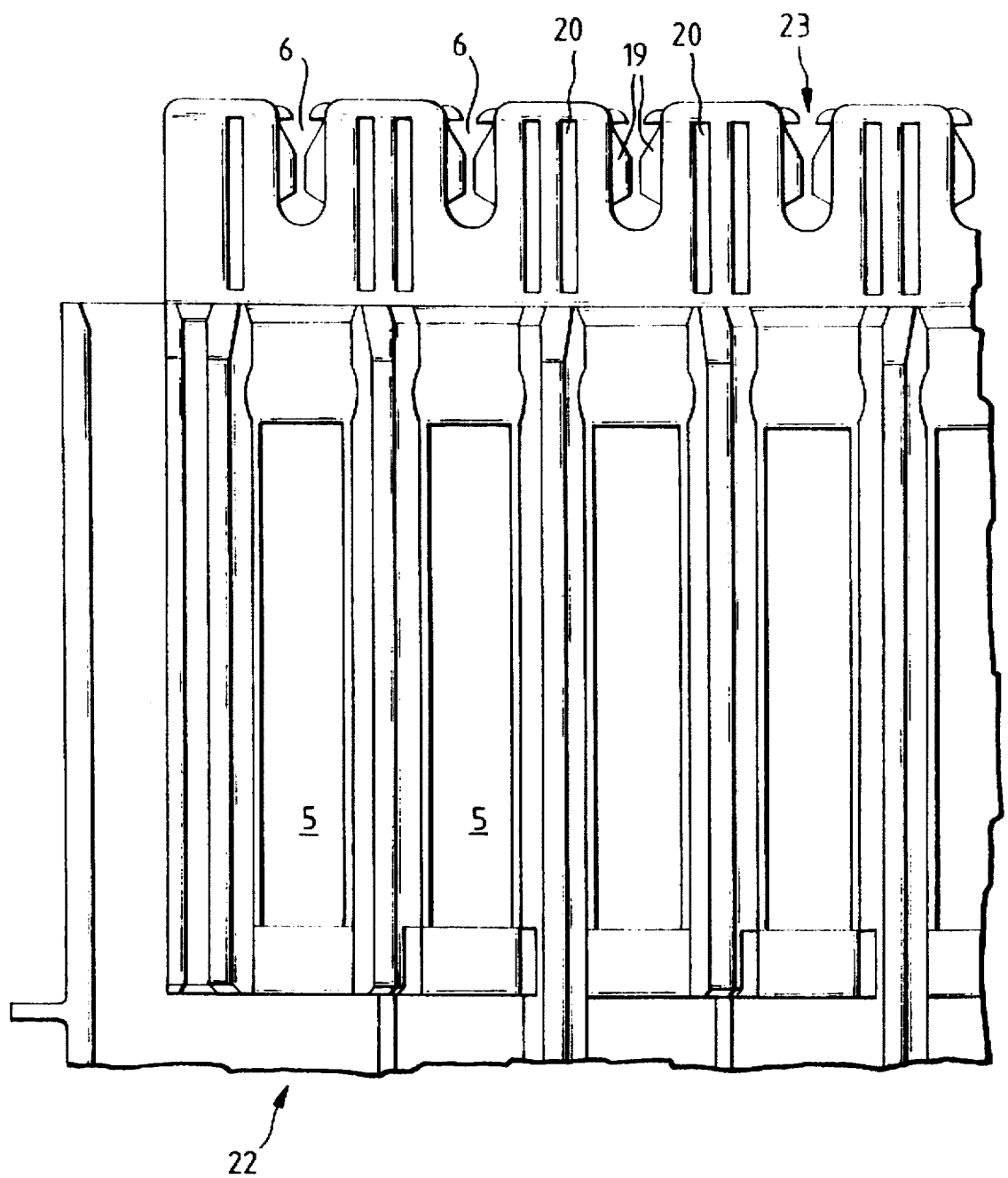

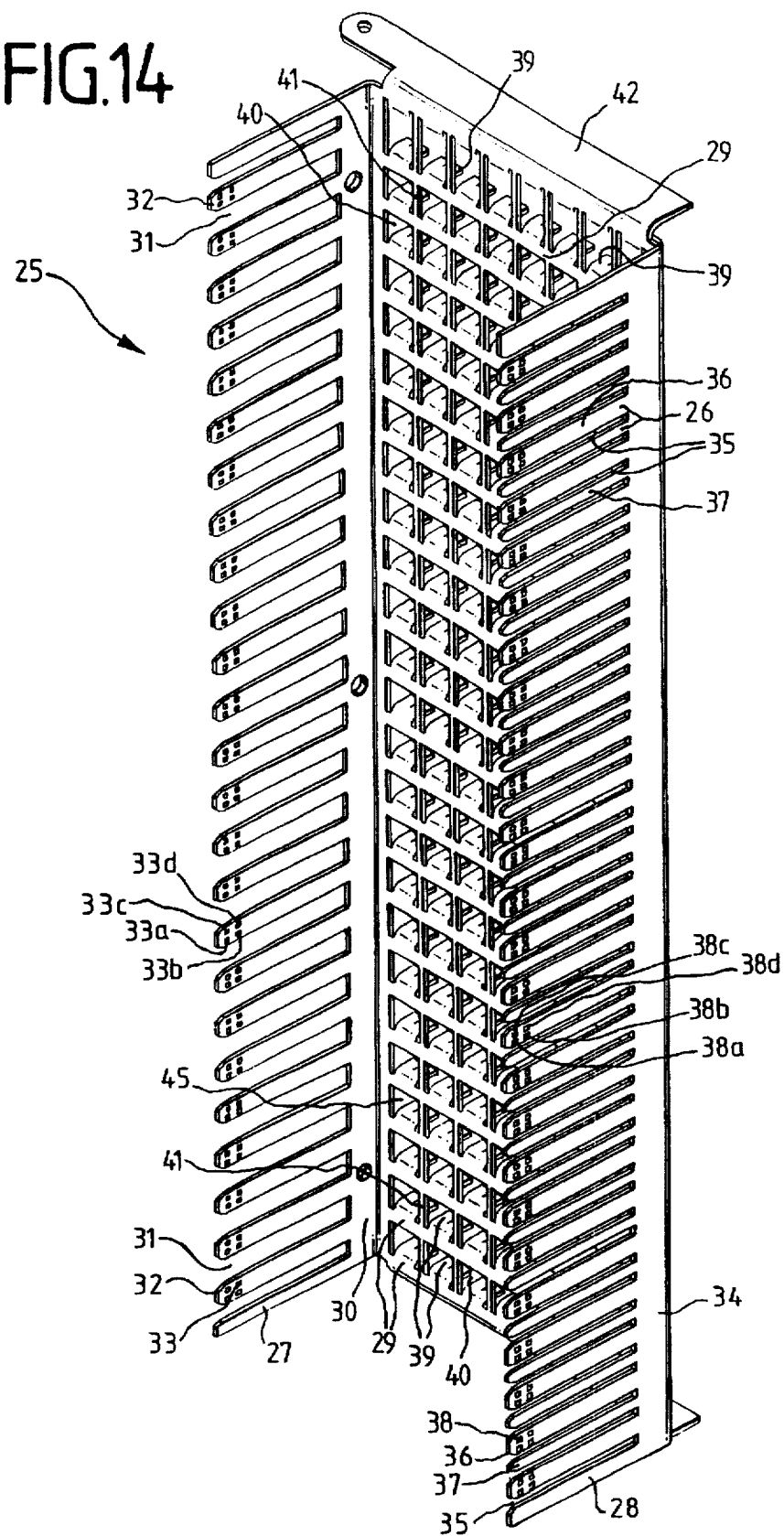

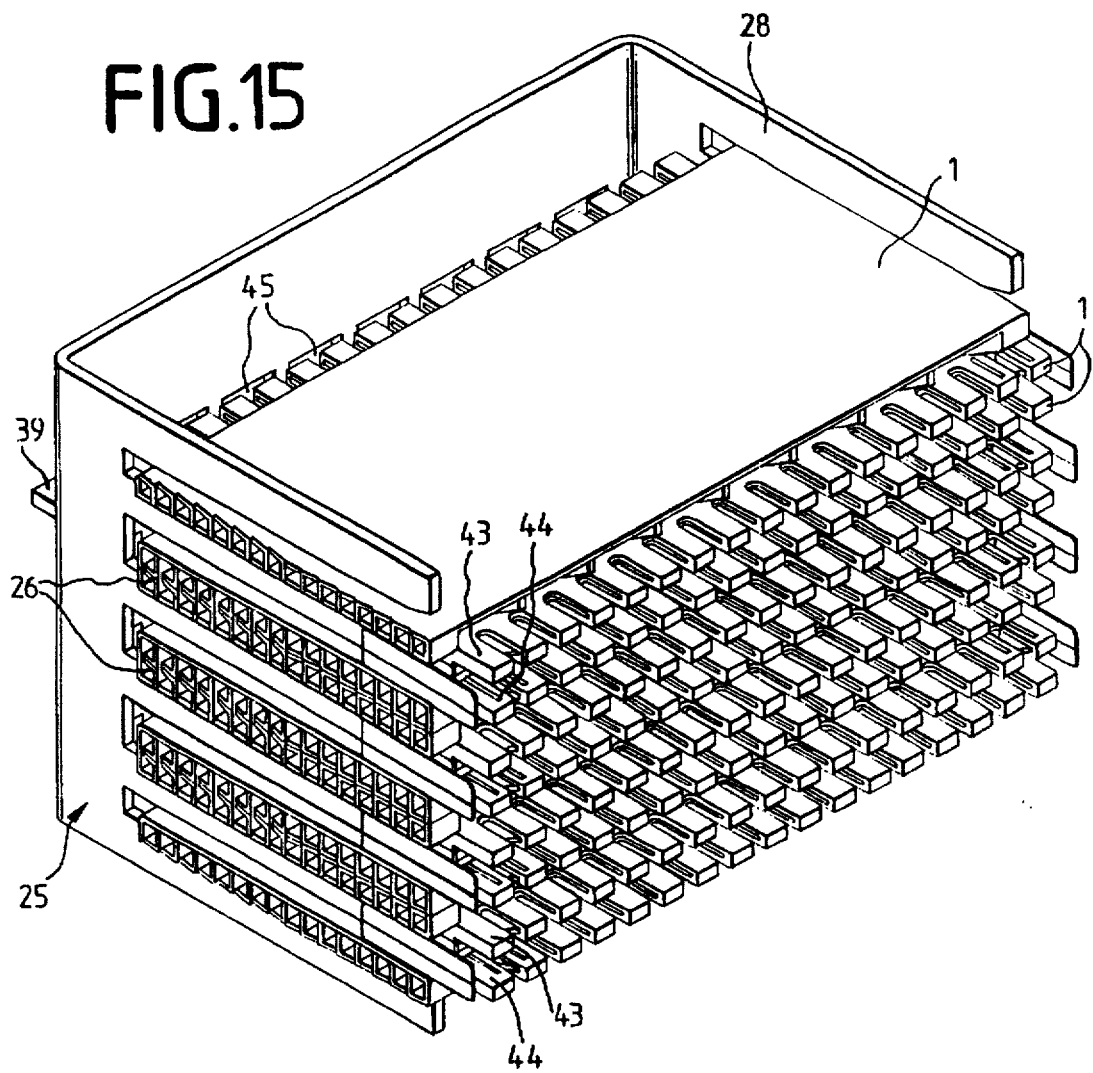

DISTRIBUTION DEVICE FOR THE TELECOMMUNICATION AND DATA TECHNIQUE

FIELD OF THE INVENTION

The present invention relates to a distribution device for the telecommunication and data transmission applications, in particular for the main distribution frame of telephone and data lines including insulation displacement contact elements for the connection of the subscriber cables as well as exchange office cables wherein one-piece contact springs are disposed in the interior of the modular-design distribution block.

The present invention also relates to receiving distribution blocks for telecommunication and data transmission applications including a U-shaped tub.

The present invention further relates to a device for guiding cables, in particular copper cables for telecommunication and data transmission applications that are roatably moved in a partial section, and comprising cable guide portions.

BACKGROUND OF THE INVENTION

Such distribution devices, in particular for the main distribution frame of telephone and data lines, serve as interfaces for the subscriber and exchange offices of telephone installations.

A distribution device, in particular for the main distribution frame of telephone and data lines, is known in the art from DE 43 06 349 C1, which is composed of a multitude of distribution blocks with contact elements disposed on the connection side for the connection of the subscriber cables as well as of the exchange office cables. Plugs to be connected from the service side to the contact elements are disposed in the interior of the distribution blocks. The contact elements are provided in the interior of the distribution blocks in side-by-side distribution components, the latter contact elements representing two disconnection positions and one connection contact on the service side and two connection contacts on the rear-side connection side. The contact elements in the interior of each distribution component form together with a double wire of the exchange office cable and of the subscriber cable a closed circuit loop, which is operated from the front service side through two openings disposed above each other. It is disadvantageous, in this prior art distribution device, that a complicated contact configuration with many individual parts makes the design of the switching means difficult. Furthermore, each jumper and protection function has to be achieved by plugs.

For overcoming these disadvantages, DE-P 44 23 339.6 suggests a distribution device of modular-design with distribution blocks forming cable termination modules with integrated voltage surge protection. The contact elements in the interior of the distribution blocks are provided with a connection contact on the connection side and another connection contact on the service side, with a telephone contact in the central area and a contact surface for contacting a voltage surge protection device.

For achieving two contact positions at least three contact elements are required with a relatively high space consumption, thus preventing further reduction of the size of the distribution device.

Mounting brackets are known for holding the distribution devices, these mounting brackets comprising a U-shaped tub with comb-type slotted side walls for receiving wire guide insets. The wire guide insets are mounted over latch hooks in the side walls. In the respectively interposed spaces there are inserted contact insets latching with the wire guide insets. The mounting brackets comprise at the cable side for each contact inset openings, into which slide-in units with voltage surge arresters can be inserted. Thereby all double wires of a contact inset are simultaneously protected. If during servicing a voltage surge arrester slide-in unit is pulled out for investigation, influences can occur on all lines of the slide-in unit. For carrying-on the earth potential from the slide-in unit to the frame, grounding contact springs are used that are disposed at the rear wall of the mounting bracket (KRONE AG product lines, catalogue, HVt devices, survey).

From DE 32 01 894 there is known in the art a receiving block composed of three partial blocks being latched on each other on tub-type receiving devices provided with tongues. In this system, the smallest functional group is ten double wire connections. Insofar this receiving device corresponds to the prior art mounting bracket described above with the described disadvantages.

The Organization of the cable paths to the distribution blocks of a distribution device is performed in a known manner according to the distribution arrangement of DE-G 93 02 456.9 such that the subscriber cable fed to the distribution device and the system cable fed to the distribution device are directed horizontally to the distribution modules.

The Organization of the cable paths is performed in conjunction with the swingable profile frames for the modules substantially in one plane. The cables are placed in U-shaped receiving portions and fixed in position by clips. When swinging the profile frame out, the cables are substantially subjected to a buckling and bending stress. Relatively high forces are required for moving the frame, if many cables are present. Cable guiding becomes difficult, if many cables have to be fed, e.g. jumper cables.

SUMMARY AND OBJECTS OF THE INVENTION

It is therefore the object of the invention to develop a distribution device of the type referred to hereinbefore such that a reduction in size, an improvement of connection tasks, the individual protection of double wires, a reliable grounding and a cable guiding being substantially resistant to buckling and bending are secured.

According to the invention, a distribution block for the telecommunication and data transmission applications is provided, particularly for the main distribution frame of telephone and data lines. The distribution block includes insulation displacement contact elements for the connection of the subscriber cables as well as the exchange office cables, and one-piece contact springs disposed in the interior of the modular-design distribution block. The one-piece contact springs disposed in the interior of the distribution block are formed by connection contacts with insulation displacement contact elements on the front and rear sides of the block. A telephone contact is provided in the central section. The telephone contact is composed of at least two contact surfaces which may be double contacts. A support surface is provided on which acts a tongue being adapted as one piece with the respective upper and lower portions of the block and having a cam. A tapping contact is provided in the front section of contact spring.

By the modular construction of the distribution block according to the functions required with the contact springs disposed therein and configured in a particularly favorable manner, a smaller space requirement is achieved. For providing two contact positions rather than three as before, only two contact elements are necessary, and thus a higher packing density when designing a main distribution frame or other distribution devices or a higher connection density per square meter is achieved. Thereby a further reduction of the size of distribution devices with further reduction of costs per connection of a double wire is obtained, all servicing tasks being possible from one side of the frame containing the distribution device that is constructed in an uncomplicated manner.

The miniaturization of the distribution block has as a consequence, namely a reduced number of transition resistances and thus a reduction of interference possibilities.

Full flexibility when switching in the complete network is achieved, in particular also by using the same components in the complete network. The switching means are simple and thus more cost-effective for manufacture. The whole wiring can also be performed, in addition to direct connection, by plugging in. Modifications are rapid and economic to make.

By the provision of openings in the rear wall (tub bottom) of the mounting bracket for plugging-in protection plugs or the like by the special shape of contact lugs, the grounding (earthing) contact springs required up to now can be omitted. The function of the earthing contact springs is met by the voltage surge protection plug to be inserted. Simultaneously, protection of individual double wires is possible, and influences on adjacent wires in a distribution block are prevented during servicing.

The cable guide portions are rigidly attached at the swingable mounting bracket and thus cooperate with the cable guide portions rigidly attached at a frame over the cables to be fed. The cable guide portions rigidly attached at the swingable mounting bracket are downwardly or upwardly offset relative to the rigidly attached cable guide portions. The cables are inclinedly directed between the cable guide portions at the swingable mounting bracket or the like and the cable guide portions at the stationary frame, the degree of inclinedness depending on the diameter of the cables to be guided.

During the swing action of the cable guide portion, the inclinedly disposed cables are substantially subjected to a torsional stress within the elastic limits. The cable stresses are therefore appreciably lower than for prior art cable guides in one plane. The force required for swinging the mounting bracket is reduced. A better Organization of the cable paths in conjunction with the swingable frame/receiving portions or the like is achieved.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a perspective view of a distribution block according to the invention in a switch contact position;

FIG. 2 is a sectional representation of the distribution block of FIG. 1 with a disconnection plug;

FIG. 3 is a sectional representation of the distribution block of FIG. 2 with a voltage surge protection device;

FIG. 4 is a sectional representation of the distribution block of FIG. 1 with a surge protection device;

FIG. 5 is a sectional representation of a distribution block in a disconnection contact position;

FIG. 6 is a sectional representation of the distribution block of FIG. 5 with a disconnection plug;

FIG. 7 is a sectional representation of the distribution block of FIG. 6 with a surge protection device;

FIG. 8 is a sectional representation of the distribution block of FIG. 5 with a surge protection device;

FIG. 13 is a top view of the rear portion of an upper or lower portion of a distribution block (section);

FIG. 14 is a perspective representation of a mounting bracket;

FIG. 15 is a perspective representation of a mounting bracket provided with distribution blocks.

DESCRIPTION OF THE PREFERRED EMBODIMENTS

Figure 16:
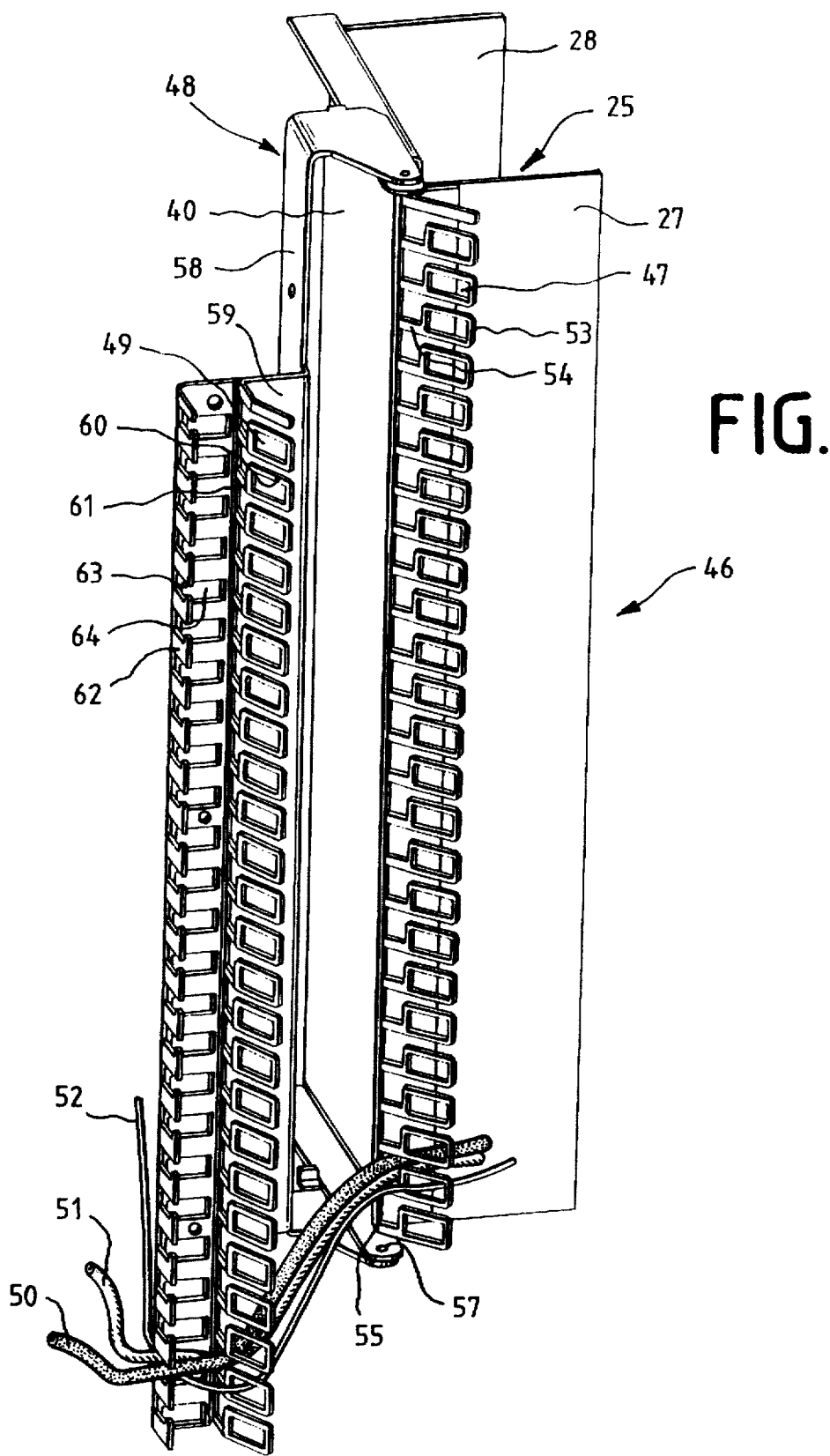
FIG. 16 is a perspective representation of the device for guiding cables.

For the construction of a main distribution frame in telecommunication and data networks, distribution blocks 1 according to FIGS. 1 to 8 are disposed on top of each other in vertical blocks in mounting brackets 25, a device according to FIG. 16 being used for guiding the cables.

Each distribution block 1 represents a functional module, e.g. in switch contact position according to FIG. 1, in disconnection contact position according to FIG. 5.

Figure 9:
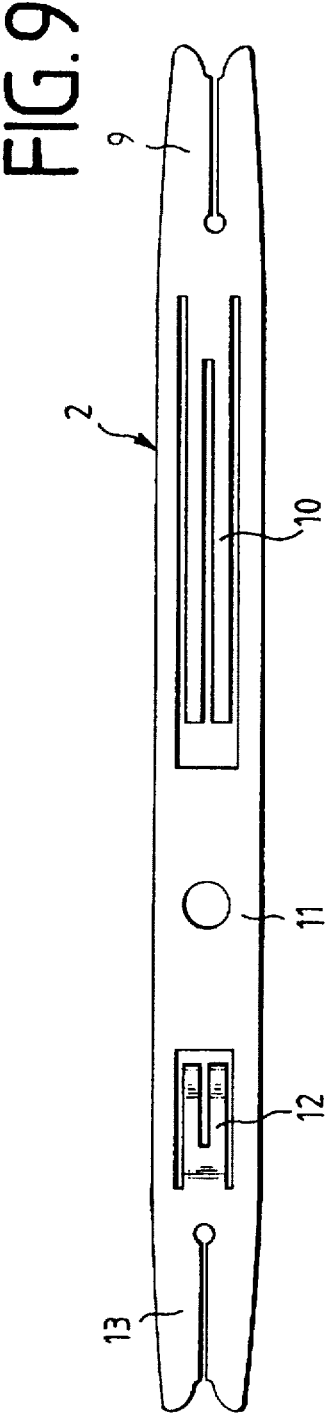
FIG. 9 is a top view of a contact spring as used in distribution blocks of FIGS. 1 to 8.
Figure 10:
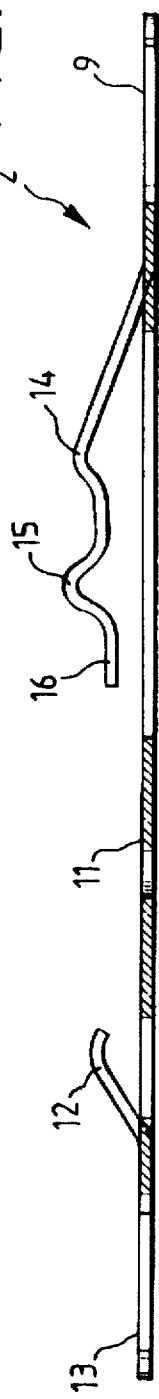
FIG. 10 is a side view (sectional representation) of the contact spring of FIG. 9.

Distribution blocks 1 are composed of identical components and only differ by the position or the arrangement of contact springs 2 according to FIGS. 9 and 10 and in the connection with or without a surge protection plug 8 or the like.

Each distribution block 1 comprises two identical segments with chambers 5 and slots 6 forming when disposed on top of each other a lower portion 3 and an upper portion 4 of distribution block 1, in chambers 5 one contact spring 2 each being included (FIGS. 1, 12, 13, 9, 10).

Figure 11:
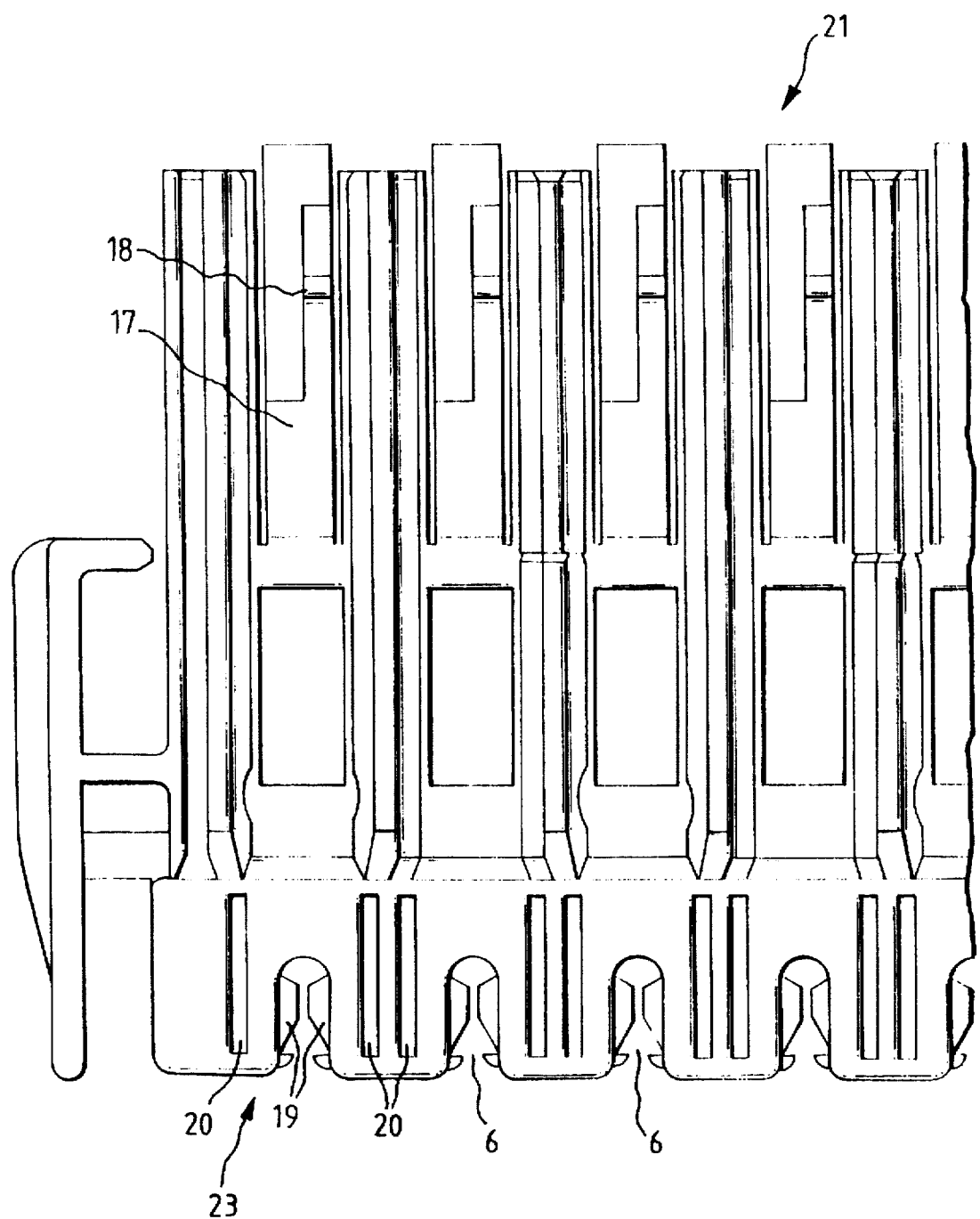
FIG. 11 is a top view of the front portion of an upper or lower portion of a distribution block (section)

Each lower portion 3 or upper portion 4, respectively, comprises a front portion 21 according to FIG. 11 and a rear portion 22 according to FIG. 13, wherein slots 6 for receiving the front and rear insulation displacement contacts 13, 9 of contact springs 2 are provided (FIG. 9, 10).

In contact zone 23 of insulation displacement contacts 9, 13 there are provided clamping webs 19 cooperating with slots 20 arranged therebehind. Clamping webs 19 and slots 20 secure that the wires to be connected (not shown) are held at their insulation such that they will not come loose even with strong vibrations and slip out of the contact.

Each line path comprises a double wire that can be individually protected. At each distribution block 1 there can be connected eight double wires, either in a main distribution frame or in cable branching devices and for transmission applications.

The individual segments of distribution block 1 are designed in the form of a plug and can be used as such in the cable network or in the exchange system. Thereby modifications can be performed at the cable network by re-arrangements. New connections or jumper actions are not required. Each cable terminated at the distribution block 1 of FIGS. 1 to 8 can rapidly be connected to any device of the transmission application.

The individual cable wires are connected by the rear or front connection contacts 13, 9 using insulation displacement contacts. This connection depends on the construction of the distribution device, optionally on the front or rear side of distribution block 1. By contact springs 2 being integrated in distribution block 1 per a wire in upper and lower portions 4, 3 of distribution block 1 there are achieved all protection and switching functions.

Contact spring 2 is configured, according to the representation in FIGS. 9 and 10, as one piece and is formed by a rear insulation displacement contact 9, a telephone contact 10, a receiving section 11 for positioning in upper or lower portion 4, 3, respectively, of block 1, by a tapping contact 12 and a front insulation displacement contact 13.

Figure 12:
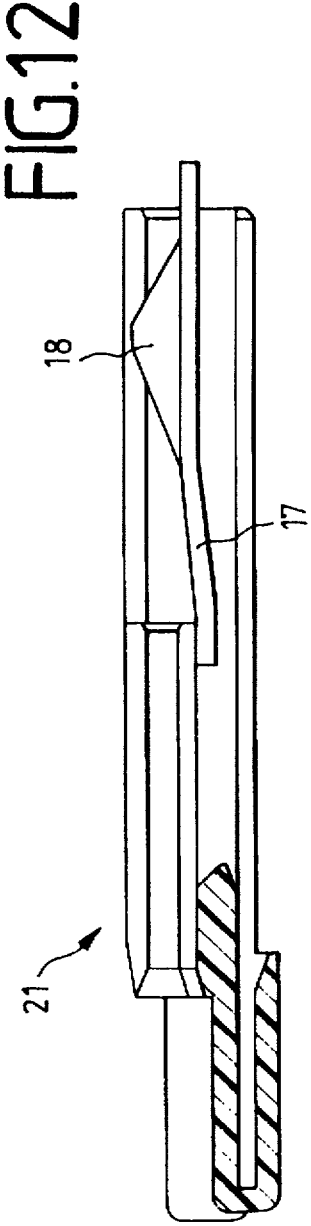
FIG. 12 is a sectional representation of the front portion according to FIG. 11.

Telephone contact 10 is bent out from the rear to central section of contact spring 2 and comprises a contact surface 14 for contacting a here not shown surge protection device, a contact surface 15 and a support surface 16. Contact surfaces 14, 15 and support surface 16 are slotted, in order to achieve a double contact and thus an even higher reliability. Contact surfaces 15 of contact spring 2 of upper and lower portions 4, 3 come together and form together the actual telephone contact 24 of distribution block 1 (e.g. FIG. 5). Support surface 16 of telephone contact 10 cooperates with a tongue 17 having a cam 18, said tongue being connected as one piece and resiliently to respective front portion 21 of upper and lower portions 4, 3 (FIG. 12). Contact surfaces 14, 15 and support surface 16 are formed at telephone contact 10 in such a way that they are connected to each other as rigidly as possible, and a very small bending of contact spring 2 takes place in the front section, when tongue 17 with cam 18 loads support surface 16 of telephone contact 10 with sufficient pressure. Tapping contact 12 is intended for measuring and testing purposes.

Into distribution block 1 can be inserted surge protection plug 8 (FIGS. 4, 8) for the respective double wires. This plug 8 contacts contact spring 2 by contact surface 14. When inserting surge protection plug 8, contact spring 2 of line-side telephone contact 10 in lower portion 3 is elastically deformed. With this arrangement the actual telephone contact 24 (FIG. 5) is opened. Surge protection plug 8 is thus electrically interposed between upper portion 4 and lower portion 3. Even with inserted surge protection plug 8, disconnection of the current path is possible by a disconnection plug 7 acting on cam 18 over tongue 17 on support surface 16 and thus also on contact surface 14 of telephone contact 10 of upper portion 4 (FIGS. 3, 7).

If, in exceptional cases, re-arrangements of individual double wires are necessary, a connection can be obtained by insertion of a disconnection plug 7 and connection of a not shown jumper wire, according to the representation in FIGS. 2, 3 of connection contact 9 or 13. The connection deviates from the 1-to-1 pattern of block 1. The distribution blocks 1 offer the possibility to re-arrange up to 100% of the connected double wires.

In an assembly as a main distribution frame, distribution blocks 1 are attached in their combination as a distribution device at a frame by means of mounting brackets 25 shown in FIG. 14 in vertical blocks in bays.

In the cable branching device, the same distribution blocks 1 can be used with the described advantages.

According to the representation in FIG. 14, a mounting bracket 25 is composed for example of twenty-five identical functional segments 26. These segments 26 are disposed on top of each other for the insertion of distribution blocks 1 (FIG. 15), for example for obtaining vertically disposed blocks in bays for the construction of a main distribution frame in the telecommunication and data transmission applications.

Comb-type slotted side walls 27, 28 are connected by webs 29 so to form a U-shaped tub. Side wall 27 comprises a comb bottom 30, wherein are alternately provided slots 31, webs 32 with four cutouts 33. Side wall 28 also comprises a comb bottom 34, wherein are alternately provided slots 31, webs 36 with four cutouts 38 and webs 37 without cutouts.

Webs 37 serve for better guiding of distribution blocks 1 to be inserted on the side of side wall 27 are present wide slots 31 for leading the not shown wires out. Here, therefore, not the individual segments 43, 44 of distribution blocks 1, but distribution blocks 1 in total are guided.

Comb bottoms 30, 34 are connected to each other by webs 29. Webs 29 are formed by cutting-free contact lugs 30 from tub bottom 40. Contact lugs 39 are rearwardly bent out, so that further webs 41 are formed.

Openings 45 generated by cutting-free contact lugs 39 and by bending them out serve for the insertion of not shown protection plugs.

For the attachment of mounting bracket 25, for example at a not shown frame, a lug 42 is bent out from tub bottom 40.

Each functional segment 26 is composed of a web 32, a slot 31, a connection web 29 with contact lugs 39 and respective openings 45, respective webs 41 and a slot 35 and a web 36.

Cutouts 33, 38 in webs 32, 36 serve for latching on distribution blocks 1 (FIG. 15).

In FIG. 15 there is schematically shown the configuration of mounting bracket 25 by way of example.

In each functional segment 26 of mounting bracket 25 there is placed a distribution block 1. The distribution blocks 1 each comprise segment 43 for the cable termination of the subscriber side and segment 44 for the cable termination of the system side. In FIG. 15 there is shown four functional segments 26. FIG. 14 shows the possibility of housing twenty-five functional segments 26.

Cutouts 38 of webs 36 and cutouts 33 of webs 32 are each arranged on top of each other and permit two different contact positions of segments 43, 44 of distribution block 1.

When the two segments 43, 44 of a distribution block 1 are latched on top of each other in the same cutouts 33, 38, a disconnection contact is obtained in distribution block 1.

If in FIG. 14 for example a distribution block 1 is latched with its segment 43 in cutouts 38c/33c and with its segment 44 in cutouts 33d/33d, a disconnection contact position exists. If, however, segment 43 of distribution block 1 latches in cutouts 38c/33c, and segment 44 in cutouts 38b/33b, a switching contact position exists.

Mounting bracket 25 is swingable (FIG. 16), in order to be able to insert a protection device through the rear side (tub bottom 40) of mounting bracket 25, for example a not shown surge protection plug. This surge protection plug contacts with its two contact tongues from behind the contacts of distribution block 1 and simultaneously contact lugs 39, which establish the electrical connection from a not shown frame to the contacts of distribution block 1 over the voltage surge protection of the surge protection plug, and permit thus the protection of each individual double wire.

FIG. 16 shows in a perspective view a device for guiding cables, as employed in a main distribution frame of a communication and data transmission application for leading the cables to a distribution device.

According to the representation in FIG. 16, the device 46 comprises for example twenty-five cable guide portions 47 having a rod frame 53 and being arranged with its rod 54 at an angle of for example approximately 45° at a corner 55 of swingable mounting bracket 25 (FIG. 14) for distribution blocks 1 shown in FIGS. 1 to 8.

In FIG. 16, walls 27, 28, 40 of mounting bracket 25 of FIG. 14 are drawn in a simplified manner without the cutouts required for receiving distribution blocks 1.

Swingable mounting bracket 25 is connected over points of rotation 56, 57 to frame 48 rigidly mounted at a not shown rack.

Frame 48 substantially comprises a rail 58 with an angled portion 59, with twenty-five cable guide portions 49 attached.

Cable guide portions 49 in turn are formed by a rod frame 60, rods 61 and frame 60 being at an angle of for example approximately 120° to each other, and by guide portions 62.

Guide portions 62 comprise an angled portion with cutouts 63, 64. Cable guide portions 49 are vertically offset relative to cable guide portions 47, here by four cable guide portions towards bottom.

Copper cables 50, 51, 52 to be fed are upwardly inclined by cable guide portions 49, 47 in the not shown distribution blocks in swingable mounting bracket 25.

Stationary system cable 50 is guided through cutout 63 of second guide portion 62 between second and third frame 60 of cable guide portion 49 and from there upwardly inclinedly between second and third frame 53 of cable guide portion 47 to the not shown distribution device in swingable mounting bracket 15.

Stationary subscriber cable 51 is parallely guided to system cable 50.

Jumper wires 52 are passed out through second frame 53 of cable guide portions 47 and second frame 60 of cable guide portions 49 and through cutout 64 of second guide portion 62 of cable guide portion 49.

By the selected cable guiding, buckling and bending stresses of cables 50, 51, 52 are substantially avoided when moving frame 48. The torsional forces generated during the rotational movement remain within the elasticity limits of cables 50, 51, 52.

A multitude of thin cables of different diameters can be fed, without obstructions therebetween.

Jumper wires 52 can be guided without difficulties after laying the system and subscriber cables 50, 51. The angle at which cables 50, 51, 52 are guided depends on the diameters thereof. The angle of cable guide portions 47, 49 can also be any other angle or can be curved.

While a specific embodiment of the invention has been shown and described in detail to illustrate the application of the principles of the invention, it will be understood that the invention may be embodied otherwise without departing from such principles.

What is claimed is:

1. A distribution block for the telecommunication and data transmission applications, comprising:

a modular-design distribution block having front and rear sides and including a modular upper block portion and a modular lower block portion cooperating to define a block interior;

one-piece contact springs disposed in said interior of said modular-design distribution block, each of said contact springs including insulation displacement connection contacts on the front and rear sides of said block for the connection of subscriber cables as well as for the connection of exchange office cables, a telephone contact in a central section of said contact springs, said telephone contact being composed of at least two different contact surface portions, a support surface, and a tapping contact provided in a front section of said contact spring; and a tongue connected with the respective upper and lower portions of said block and having a cam for acting on said support surface upon insertion of a disconnection plug, said cam moving said support surface and said two different contact surface portions without the disconnection plug contacting said two different contact surface portions.

2. A distribution block according to claim 1, wherein said insulation displacement contacts in respective front and rear portions of upper and lower portions of said block each have a contact zone and clamping webs are provided, in conjunction with slots disposed therebehind for the insulated part of the wires to be connected.

3. A distribution block according to claim 1, wherein different contact surface portions and support surface of said telephone contact are connected to each other as rigidly as possible, and a bending of said contact spring is provided in a section of connection of said contact spring.

4. A distribution block according to claim 1, wherein a surge protection plug contacts over one contact surface of said contact spring and/or that the disconnection plug acts over said tongue on said support surface of said contact spring and on said cam and interrupts a current path formed between adjacent contact springs.

5. The distribution block according to claim 1, in combination with a mounting bracket for receiving distribution blocks of communication and data transmission applications, comprising a U-shaped tub with a bottom provided with contact lugs for the establishing an electrically conducting connection and openings for the insertion of plug elements.

6. The distribution block according to claim 5, wherein said openings are formed by bending out contact lugs.

7. The distribution block according to claim 1 in combination with a rack frame and a device for guiding cables, in particular copper cables in the communication and data technique that are roatably moved in a partial section, said device comprising:

cable guide portions rigidly disposed at said rack frame and positioned upwardly and downwardly offset to cable guide portions disposed at a swingable receiving portion.

8. The distribution block according to claim 7, wherein guide means are provided for inclinedly guiding cables from stationary cable guide portions to cable guide portions disposed at swingable receiving portion.

9. The distribution block according to claim 8, wherein a degree of inclinedness of cables is determined by the diameters of said cables.

10. The distribution block according to claim 1, wherein the block is for a main distribution frame of telephone and data lines.

11. The distribution block according to claim 1, wherein said tongue is formed as one piece with the respective upper and lower portions of said block and having a cam for acting on said support surface.

12. The distribution block according to claim 1, wherein a surge protection plug contacts over one contact surface of said contact spring.

13. The distribution block according to claim 1, wherein a current path is formed between adjacent contact springs and a disconnection plug acts over said tongue on said support surface of said contact spring and on said cam and interrupts said current path formed between adjacent contact springs.

14. The distribution block according to claim 1, further comprising a mounting bracket for receiving the distribution block, said mounting bracket comprising a U-shaped tub with a bottom provided with contact lugs for the establishing an electrically conducting connection and openings for the insertion of plug elements.

15. The distribution block according to claim 14, wherein said openings are formed by bending out contact lugs.

16. A distribution block according to claim 1, further comprising a device for guiding copper cables that are roatably moved in a partial section, said device including cable guide portions rigidly disposed at a rack frame and positioned upwardly and downwardly offset to cable guide portions disposed at a swingable receiving portion.

17. The distribution block according to claim 16, wherein guide means are provided for inclinedly guiding cables from stationary cable guide portions to cable guide portions disposed at swingable receiving portion.

18. A device according to claim 17, wherein a degree of inclinedness of cables is determined by the diameters of said cables. guide portions to cable guide portions disposed at swingable receiving portion.

19. A distribution block for the telecommunication and data transmission applications, comprising:

a modular-design distribution block having front and rear sides and including an a modular first block portion and a modular second block portion cooperating to define a block interior;

a first one-piece contact spring disposed in said interior of said modular-design distribution block and a second one-piece contact spring disposed in said interior of said modular-design distribution block, each of said contact springs including insulation displacement connection contacts on the front and rear sides of said block for the connection of subscriber cables as well as for the connection of exchange office cables, a telephone contact in a central section of said contact springs, said telephone contact being composed of at least two different contact surface portions, a support surface, and a tapping contact provided in a front section of said contact spring;

a first tongue connected with said first portion of said block and having a cam for acting on said support surface of said first contact spring; and a second tongue connected with said second portion of said block and having a cam for acting on said support surface of said second contact spring, each tongue cooperating with a disconnection plug for moving said cam and contacted support surface and said two different contact surface portions without the disconnection plug contacting said two different contact surface portions.

20. The distribution block according to claim 1, further comprising a mounting bracket for receiving the distribution block, said modular first block portion being movable relative to said modular second block portion and being positionable in a first position and a second position with respect to said mounting bracket and said modular second block portion being movable relative to said modular first block portion and being positionable in a first position and a second position with respect to said mounting bracket to form each of a contact position wherein said two different contact surface portions of each of said first contact spring and second contact spring are moved in and out of contact.

* * * * *